United States Patent Office 3,755,530
Patented Aug. 28, 1973

3,755,530
PROCESS FOR TREATMENT OF
WASTE SOLUTIONS
Arthur Julian Avila, Naperville, Ill., and Raymond Edward Jaeger, Basking Ridge, and Thomas John Miller, Piscataway, N.J., and Harold Alfred Sauer, Hatboro, Pa.; said Avila, assignor to Western Electric Company, Incorporated, New York, N.Y., said Jaeger, Miller and Sauer, assignors to Bell Telephone Laboratories, Incorporated, Murray Hill, N.J.
No Drawing. Filed Nov. 24, 1971, Ser. No. 202,017
Int. Cl. C01g 3/00, 5/00, 7/00, 51/00, 53/00, 55/00
U.S. Cl. 423—22           5 Claims

ABSTRACT OF THE DISCLOSURE

Solids are removed from waste solutions of metal finishing processes by injecting droplets of the solution into a refrigerant to quick-freeze them, followed by removal of ice by sublimation in a controlled vacuum. The solids may then be incinerated to decompose metallic salts and in particular toxic materials such as cyanides to leave a residue which may be rich in precious or costly nonprecious metals or their oxides, such as gold, silver or copper oxide. These metals may be recycled, while the sublimed water may be either condensed and reused or discarded.

BACKGROUND OF THE INVENTION

(1) Field of the invention

This invention relates to the treatment of chemical waste solutions to recover materials of value from them and to condition them for recycling or ultimate disposal.

(2) Prior art

It has been estimated that there are between 15,000 and 20,000 metal finishing facilities in the United States. These facilities include those in which both electrolytic and electroless processes are practiced, such as plating, winning, etching, pickling, cleaning, etc. The waste effluents from these processes contain significant amounts of processing materials and represent a significant potential contribution to pollution of streams, lakes, etc. Such pollution may be either direct, owing to the presence of toxic or corrosive materials, such as cyanide, hexavalent chromium, heavy metals, acids and alkalies in such waste effluents; or indirect owing to the deleterious effects which these components may exert on sewage treatment systems. While government regulation of such process effluents have been in effect for some time, the recent setting of more rigorous standards as well as the more rigorous enforcement of such standards has: (1) highlighted the limitations in existing waste treatment processes; (2) caused interest in waste treatment processes whose costs have heretofore been considered by some to be prohibitive; and (3) caused interest in the development of new processes. For similar reasons, the recovery and recycling of certain process materials is becoming increasingly attractive.

Existing processes which have been proven to be more or less commercially feasible for the separation of solids from waste metal finishing solutions include precipitation, evaporation, ion exchange and electrolysis. Of these, precipitation and evaporation are among the most widely practiced.

Probably the main limitation of precipitation is that it necessitates filtration or centrifuging, which on a commercial scale are generally ineffective to remove fines (particles less than about 10 microns in size) from the solution. These fines may represent prohibitive levels of contaminants. For example, as little as 5 p.p.m. total of certain metals or cyanide has been reported as being capable of disrupting digestion, a process which often follows secondary treatment in sewage treatment plants.

Due to the times required, evaporation is generally economical only for fairly concentrated (low volume) waste solutions, and not for the large volumes of rinse water which, while less concentrated, nevertheless typically contain prohibitive levels of contaminants.

In ion exchange, ions are removed from solution by selective adsorption onto a cation or anion exchange resin. The primary limitation of this technique is that it is often difficult to completely recover the adsorbed ions, particularly cyanide ions, from the resin, with the result that in practice it seldom proves economical to remove more than about 75 percent of these adsorbed ions during each recovery and resin regeneration cycle. While this limitation may not be serious in the purification for recycling of rinse water, in many cases it effectively prevents reliance upon this method for treatment prior to disposal due to the absolute level of pollutants left in solution.

Electrolytic treatment is not in widespread use due to its expense and its inability to reduce solids to the very low levels typically required for waste solution disposal.

Finally, all of the above methods appear at their present stages of development not to be amenable to continuous processing and all of them, except evaporation, leave certain components behind in solution, which may necessitate further processing to recover these components or convert them to an innocuous, disposable form.

Thus, the search continues for waste solution treatment methods which will be effective, economical and amenable to continuous processing.

SUMMARY OF THE INVENTION

It has now been discovered that solids may be removed from waste solutions of metal finishing processes by freezing globules or droplets of the solutions and removing the solvent from the frozen globules or droplets by sublimation. The dried agglomerates may then be recycled, discarded or treated further, such as conversion to another form by decomposition, chemical reaction or reduction. In a preferred embodiment, solids containing precious or costly nonprecious metals are incinerated to a metal or metal oxide-rich residue which is ultimately recycled. Where the decomposition product is a reducible metallic compound, such as the oxide, the metal may be obtained by carrying out the incineration in a reducing atmosphere.

During incineration, harmful pollutants such as cyanide and hexavalent chromium compounds are converted to innocuous forms.

The sublimed solvent may be either condensed and recycled or discarded.

Where the waste solution has a large volume or low concentration of solids, the solution may be concentrated prior to solids separation by cooling it to a temperature at or slightly below the freezing point of the solvent, and maintaining the solution at this temperature for a time sufficient to allow partial freezing of the solvent, then solution.

DETAILED DESCRIPTION

The basic freeze-drying technique utilized herein has been described elsewhere, in U.S. Pats. 3,551,533 and 3,516,935, assigned to Bell Telephone Laboratories, Incorporated. However, as an aid to the practitioner, the relevant aspects of this procedure are briefly summarized below.

While the description is largely in terms of aqueous solutions, it is to be understood that the technique is not so limited, but may apply to other solvent-solute systems as well.

Furthermore, while the technique is readily controlled to give discrete particles of solids, such control is ordinarily not required for most of the envisioned applications, and may even prove to be uneconomical in some cases. Thus, in general, some degree of particle agglomeration is tolerable, and the description is thus largely in terms of an agglomerated product.

Droplet formation

Depending upon the final use envisioned, droplet formation may or may not be necessary. Bulk mixing of the solution with a liquid refrigerant, for example, will often result in the formation of globules of solution therein, which may result in commercially expedient freezing, drying and incineration rates. Higher rates may be achieved by stirring to break up the globules, thus increasing the surface area exposed. However, for optimum freezing, drying, and incineration rates, droplet formation or atomizing is required. Atomizing may take any conventional form, for example, forcing the solution through an orifice. Alternative procedures include interaction of a rotated disc or air currents with a stream.

Freezing

Freezing must be carried out with sufficient rapidity to prevent substantial coalescence of the globules or droplets which would reduce the surface area of the frozen and dried products and thus reduce the drying and incineration rates. Generally, it has been found that freezing within a period of 5 seconds or less with a preferred time of 3 seconds or less assures adequate agglomerate integrity.

Suitable refrigerants include liquid isoheptane; liquid nitrogen; hexane; cumene; dimethylbutane; trichlorethylene; 1,2 dichloropropane; and fluorinated ethers having the generic formula $$F\left(\begin{array}{l}CFCF_2O\\|\\CF_3\end{array}\right)_n CHFCF_3$$

and having $n$ from 1 to 5. These are generally known commercially as the Freon E Series. In general the requirements are that the refrigerant be liquid at the freezing temperature of the solution, that no deleterious reaction occur between the refrigerant and the solution and that the refrigerant and solution be substantially immiscible. Gaseous refrigerants may also be used, although in general they result in slower freezing rates. Solution-to-refrigerant volume ratios found to be suitable in practice to prevent substantial coalescence and to achieve adequate freezing rate and heat capacity of the refrigerant range from 1:2 to 1:100.

Stirring may be desired in that it results in greater efficiency of the refrigerant, avoids localized heating and possible segregation.

In a preferred solution freezing technique, described in U.S. patent application Ser. No. 15,001, filed Feb. 27, 1970, droplets are formed by injecting solution through orifices at the bottom of a two-refrigerant vessel. The refrigerants having been chosen with densities greater than that of the solution, the droplets rise through the refrigerants to the top of the vessel. The temperature in the lower refrigerant at the orifice tip is maintained above the freezing point of the solution by means of a suitable heat source such as a hot air blast so as to prevent clogging of the orifice by freezing droplets, while the upper refrigerant is maintained well below the freezing point of the solution by means of cold nitrogen gas circulating through coils. The liquid-liquid interface between the two refrigerants is maintained in a chaotic condition due to convection currents in the two refrigerant phases as well as to the small difference in densities of the two phases. A typical temperature profile within the freezing vessel is as follows: the temperature at the tip of the orifice is 5° C. but drops rapidly to almost −45° C. at the interface and is maintained at a practically constant temperature of −62° C. within the upper refrigerant. The chaotic interface tends to prevent droplet coalescence, thus permitting high injection rates. This, together with the fact that frozen droplets may be collected at the top of the vessel, makes this method readily adaptable to a continuous process which can be scaled to plant production.

Collection of Frozen Droplets

Collection may be carried out in a variety of ways. Where the frozen droplets are more dense than the refrigerant, they may collect at the bottom of the vessel and may be recovered by decanting the refrigerant. If the frozen droplets are less dense than the refrigerant, as in the above-described technique, they may rise to the surface and be collected there. Collection should, of course, be at a temperature lower than that of the freezing point of ice. Ordinarily, precaution should be taken to prevent sticking together of agglomerates, such as might result from an excessive weight of collected frozen droplets.

Sublimation

It is essential that no part of the frozen solution be permitted to exist in the liquid phase during this step, since such would lead to sticking together of agglomerates and consequent reduction in surface area. It is generally desirable to remove the water as quickly as possible. Limiting conditions include the maximum rate at which heat may be introduced into the system as well as the maximum rate at which water may be removed.

It is generally desirable to carry out vacuum sublimation at pressures no greater than about 1 millimeter of mercury. Lower pressures are preferred since they result in an increased sublimation rate. Heat must be added to the system during sublimation in the case of aqueous solutions in order to achieve commercially expedient sublimation rates.

While carrying drying to completion is not essential, removal of at least 90 percent of the water in general being sufficient, complete drying is nevertheless preferred since it tends to (1) increase the amount of water available for recycling, (2) prevent melting of ice with sticking together of agglomerates which would reduce surface area, and (3) reduce heat required for subsequent conversion steps. In addition, a dried product may be mixed with wet solids from other waste sources to reduce their moisture content and to facilitate handling.

Conversion

Depending upon the composition and the final use envisioned, conversion may or may not be necessary. Where it is desired to recover noble metals which ordinarily do not form oxides such as Au, Pt, Pd, Ir, Rh, the conversion may expediently take the form of a thermal decomposition or incineration in an oxidizing or neutral atmosphere. The only requirement is that the temperature be above the decomposition temperature. By way of example, where the soluble salts are cyanides, decomposition temperatures depending upon the nature of the cations range from about 400° C. to 1200° C.

Where thermal decomposition in an oxidizing or neutral atmosphere would result in recovery of reducible metallic compounds such as AgO, CuO, CoO, $Cr_2O_3$, etc., it may be preferred to carry out the incineration in a reducing atmosphere, in order to obtain the metals in elemental form. It has been found that higher decomposition temperatures or longer decomposition times may result in increased particle size, which may be of concern, particularly where the residue is to be composted rather than recycled.

Additives

As disclosed and claimed in copending U.S. patent application Ser. No. 180,505, filed Sept. 14, 1971, drying of certain metal salt solutions, particularly at higher concentrations of solute, is promoted and the freezing point of the solution elevated, by the introduction of certain additives into the solution. Such additives include ammonium hydroxide; tetraalkyl ammonium hydroxide, denoted by the generic expression $R_4N^+(OH)^-$, where R is selected from the series consisting of ethyl, methyl, propyl, and butyl (and combinations thereof); and ethylene diamine tetraacetic acid (EDTA) or metal salts thereof, including Na and K salts. These additives when present in the solution in an amount sufficient to result in an increase in the pH of the solution of at least 10 percent enhance water removal from the solution during sublimation by promoting crystal formation and ice-crystal phase separation during freezing. However, it is preferred for optimum effectiveness for the additive to be present in an amount sufficient to result in a pH increase of at least 30 percent. Further additions tend to result in further enhancement of water removal, the upper limit being determined by a pH just short of that which results in precipitation of solute. In general, for given aqueous solute systems, as the concentration of solute increases, more additive is required to achieve a desired change in pH; conversely, less additive is needed at higher concentrations to achieve a desired change in freezing point.

Aqueous solutions whose freeze-drying has been found to be enhanced by the presence of the above additives for the achievement of drying by sublimation include ferric chloride, aluminum nitrate, ferric sulfate, yttrium sulfate, chromium sulfate, copper sulfate and ferric nitrate solutions.

Concentration

Where the volume of the waste solution to be treated is so large, or the concentration of solids therein so low as to render the yield of solids per unit volume of treated solution impractically small, the solution may first be concentrated by maintaining it at a temperature at or slightly below the freezing point of the water for a time sufficient to freeze at least a portion of the water, and thereafter separate the ice from the solution. The temperature of the solution must of course be maintained above the freezing point of the solution, so as to avoid the loss of solids.

Since the degree of depression of the freezing point of a solution below that of the solvent will in general tend to increase with increasing concentration of solids in solution, the rather dilute solutions which will usually be of interest for concentration may have freezing points near that of the water. Thus, control of the concentration temperature of the solution to within a degree or less may be necessitated in certain instances.

In general, it may be stated that with water as the solvent, maintaining the temperature from —4° C. to 0° C. will result in substantial water removal by freezing within 15 minutes to 1 hour.

EXAMPLE I

A gold cyanide electroplating solution containing in ounces per gallon 1 of $KAu(CN)_2$ and 2 of KCN was injected into a two-refrigerant freezing vessel of the type described above, through a 5 orifice injector, each orifice having an inside diameter of 6 mils. The lower refrigerant was a fluorinated ether having the formula

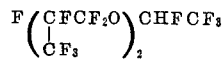

and the upper refrigerant was trichlorethylene. The temperature gradient in the vessel was approximately that described above. The resultant frozen droplets, about a liter in volume, were collected at the top of the vessel and transferred to a wire basket in a drying chamber at a temperature of about —50° C. and pressure of about 20μ Hg. The basket was rotated and the temperature was gradually increased. Drying was completed within about one and a half hours, during which time the temperature had risen to about +50° C. The dried solids were then transferred to a furnace and incinerated at 900° C. in air for 1–8 hours. The solids appeared to ignite and slowly burn with a noticeable reduction in volume. After cooling, the residue was examined and appeared to consist largely of bright metallic gold. The residue volume was estimated to be about 1 to 2 percent of the original frozen solids volume.

EXAMPLE II

The procedure of Example I was repeated for a silver cyanide plating solution containing in ounces per gallon 12.8 AgCN, 8 KCN and 2 $K_2CO_3$. The residue appeared to be largely metallic silver, and about 1 to 2 percent of the original frozen solids volume.

EXAMPLE III

The procedure of Example I was repeated for a copper sulfate plating bath containing in ounces per gallon 30 of $CuSO_4·5H_2O$, 7.5 of $H_2SO_4$ and by volume 0.5 percent of a proprietary brightener, except that about .09 parts by volume of a 28.5 weight percent solution of $NH_4OH$ was added, resulting in a pH of about 2. The residue appeared to be largely black copper oxide, and about 1 to 2 percent of the original solids volume.

What is claimed is:

1. A method for recovering soluble salts of metals selected from the group consisting of Au, Pt, Pd, Ir, Rh, Ag, Cu, Co, and Cr from the waste solution of a metal finishing process comprising the steps of:
   (1) Concentrating the solution by maintaining it at a temperature sufficient to freeze at least a portion of the solvent, followed by removing the frozen solvent from the remaining solution;
   (2) Freezing droplets of the concentrated solution by injecting the solution through at least one orifice into the bottom portion of a vessel containing at least one liquid refrigerant, the refrigerant being more dense than the solution so as to cause the droplets to rise to the top of the vessel;
   (3) Collecting the frozen droplets at the top of the vessel;
   (4) Removing solvent from the frozen droplets by sublimation; and
   (5) Heating the droplets to at least partially thermally decompose the salts.

2. The method of claim 1 in which the salt metals are selected from the group consisting of Ag, Cu, Co, Cr and in which the heating step is carried out in a reducing atmosphere.

3. The method of claim 1 in which the vessel contains two refrigerants of different densities, an upper refrigerant and a lower refrigerant, and in which the temperature in the vicinity of the orifice is above the freezing point of the solution and the temperature in the upper refrigerant is below the freezing point of the solution, so as to create a negative temperature gradient across the liquid-liquid interface between the two refrigerants.

4. The method of claim 1 in which the soluble salts are cyanides and the heating step is carried out within the temperature range of 400° C. to 1200° C.

5. The method of claim 4 in which the soluble cyanide salts are selected from the group consisting of $KAu(CN)_2$ and AgCN, and the heating step is carried out at a temperature of 900° C. for from 1 to 8 hours.

References Cited

UNITED STATES PATENTS

| | | | |
|---|---|---|---|
| 3,516,935 | 6/1970 | Monforte et al. | 264—28 |
| 3,551,533 | 12/1970 | Monforte et al. | 264—28 |
| 3,607,753 | 9/1971 | Suchoff | 264—28 |
| 3,384,687 | 5/1968 | Flack et al. | 264—14 |
| 3,653,222 | 4/1972 | Dunn et al. | 264—13 X |

HERBERT T. CARTER, Primary Examiner

U.S. Cl. X.R.

75—117, 118, 119, 121; 62—58; 423—23, 42, 53, 55, 138, 141; 34—5; 264—5, 14, 28

UNITED STATES PATENT OFFICE
CERTIFICATE OF CORRECTION

Patent No. 3,755,530  Dated  August 28, 1973

Inventor(s) A. J. Avila et al

It is certified that error appears in the above-identified patent and that said Letters Patent are hereby corrected as shown below:

Column 2, line 56, after the word "then" insert --separating the frozen solvent leaving a concentrated--.

Signed and sealed this 18th day of December 1973.

(SEAL)
Attest:

EDWARD M. FLETCHER, JR.  RENE D. TEGTMEYER
Attesting Officer  Acting Commissioner of Patents